(No Model.) 7 Sheets—Sheet 2.

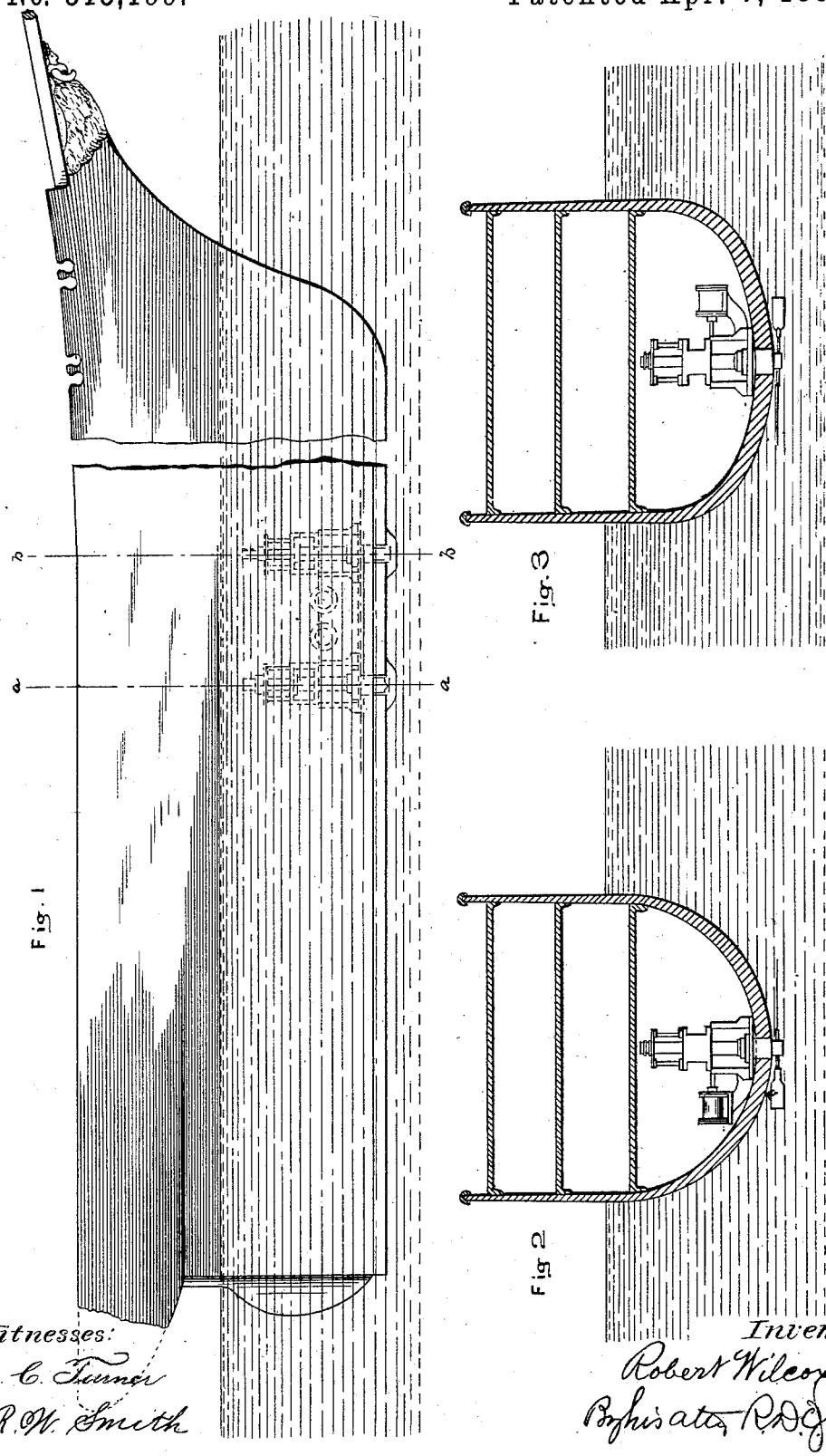

R. WILCOX.
STEAMSHIP PROPELLER AND MACHINERY THEREFOR.

No. 315,199. Patented Apr. 7, 1885.

Witnesses:
J. C. Turner
R. W. Smith

Inventor:
Robert Wilcox
By his atty
R. D. Smith (No Model.) 7 Sheets—Sheet 4.
R. WILCOX.
STEAMSHIP PROPELLER AND MACHINERY THEREFOR.
No. 315,199. Patented Apr. 7, 1885.

Witnesses: Inventor:
J. C. Turner Robert Wilcox
R. W. Smith By his atty
R. D. O. Smith

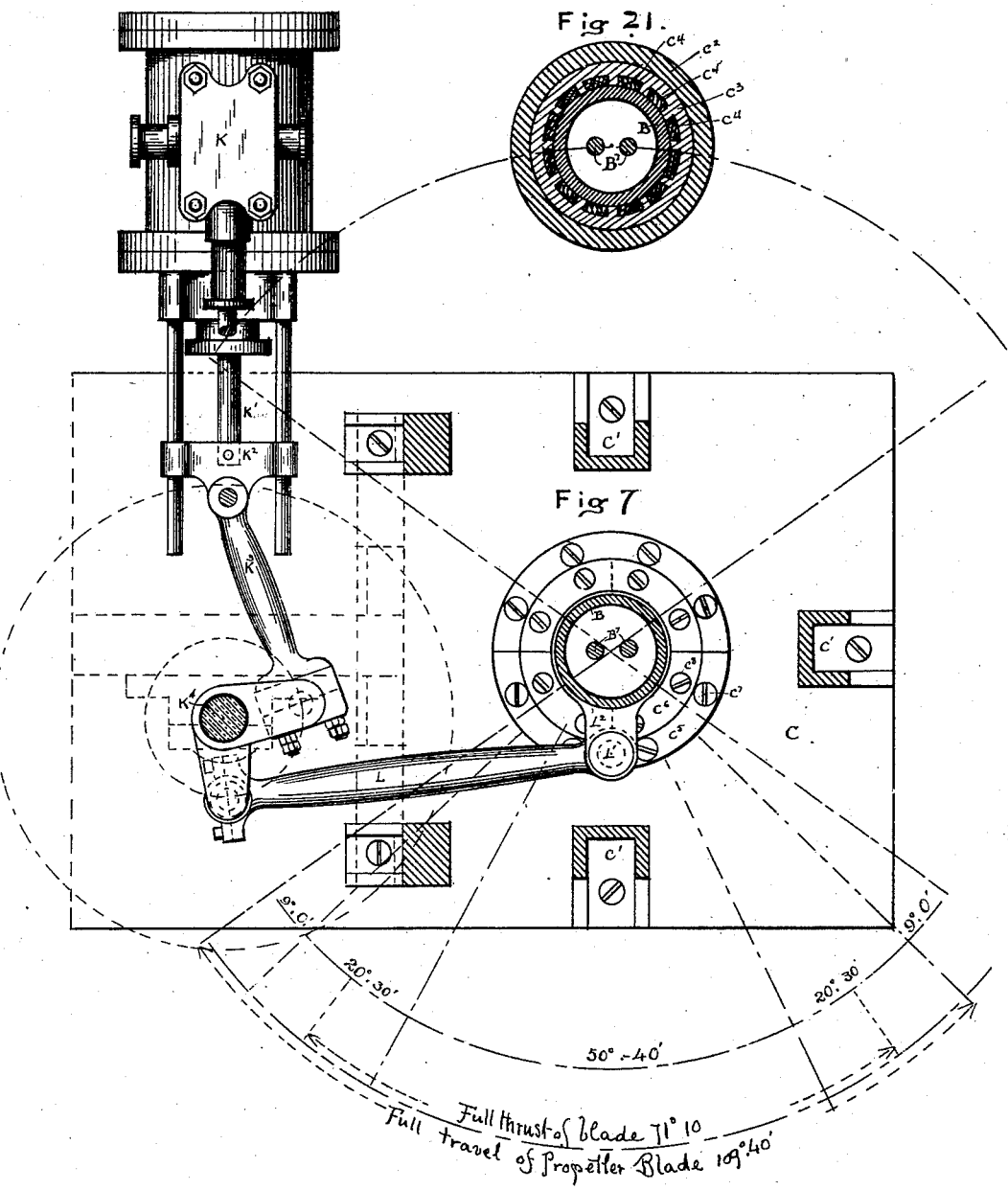

(No Model.) 7 Sheets—Sheet 6.
R. WILCOX.
STEAMSHIP PROPELLER AND MACHINERY THEREFOR.
No. 315,199. Patented Apr. 7, 1885.
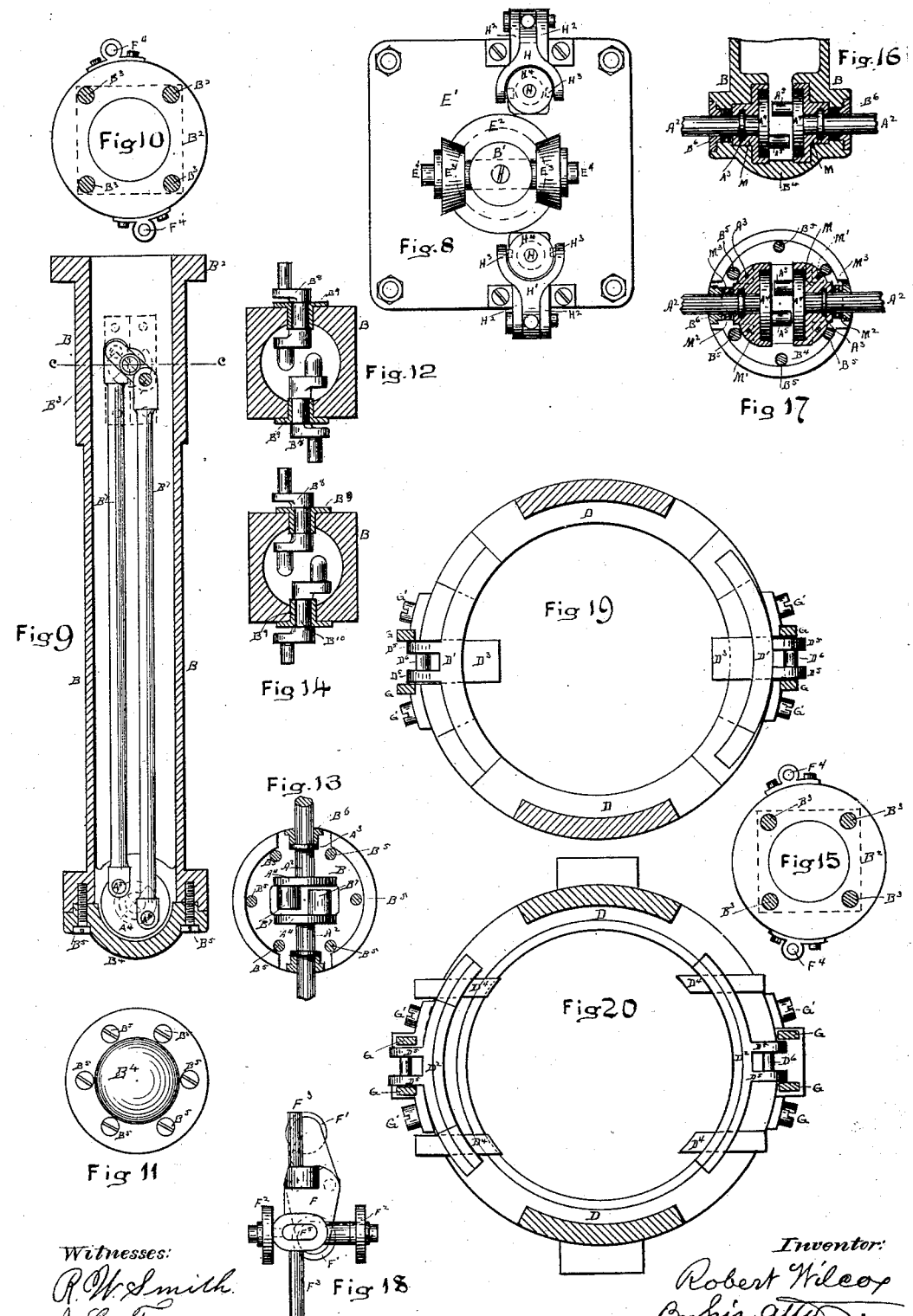
Witnesses:
R. W. Smith
J. C. Turner
Inventor:
Robert Wilcox
By his atty
R. W. Smith (No Model.) 7 Sheets—Sheet 7.
R. WILCOX.
STEAMSHIP PROPELLER AND MACHINERY THEREFOR.
No. 315,199. Patented Apr. 7, 1885.
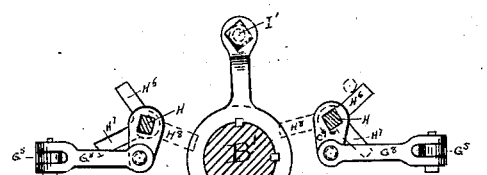
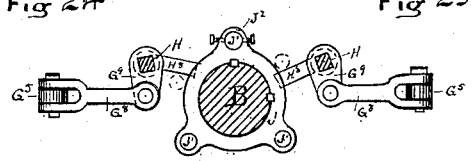
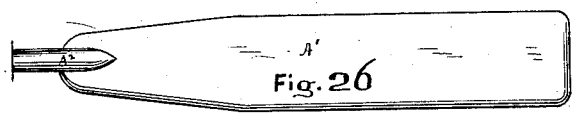
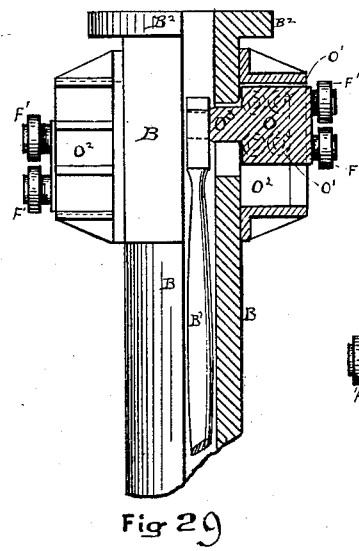
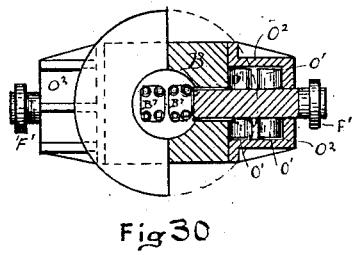
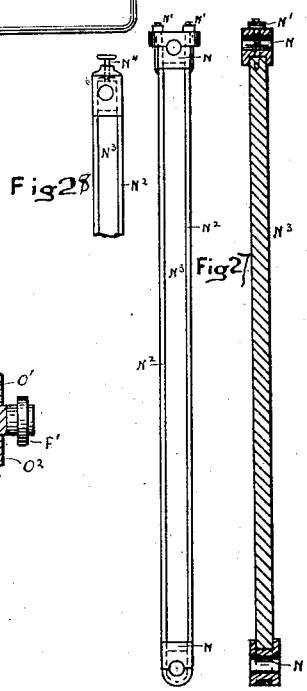
Witnesses:
J. C. Turner
R. W. Smith
Inventor:
Robert Wilcox
By his atty
R. W. Smith
N. PETERS. Photo-Lithographer, Washington, D. C.

United States Patent Office.

ROBERT WILCOX, OF ST. KILDA, VICTORIA.

STEAMSHIP-PROPELLER AND MACHINERY THEREFOR.

SPECIFICATION forming part of Letters Patent No. 315,199, dated April 7, 1885.

Application filed December 10, 1884. (No model.) Patented in England May 15, 1884, No. 7,774.

*To all whom it may concern:*

Be it known that I, ROBERT WILCOX, a subject of the Queen of Great Britain, residing at Fawkner Street, St. Kilda, in the British Colony of Victoria, engineer, have invented new and useful Improvements in Steamship-Propellers and in Machinery for Driving the Same, of which the following is a specification.

My improved propeller for steamships has been designed for the purpose of superseding the screw-propellers at present in use, which are placed at the stern of the ship.

My propeller is placed under the bottom of the ship, so that it is always under water, and consequently cannot "race," which is one of the greatest objections to ordinary screw-propellers.

My improved propeller consists of two oar-shaped blades whose shafts are properly fitted and work in the bearings provided in the lower end of a vertical cylindrical trunk, which also works in suitable water-tight bearings, and projects through the bottom of the ship in a gap provided in the keel of the vessel for that purpose. To this trunk, and consequently to the blades, a reciprocating motion is given by an arm on it, which is worked by a connecting-rod from the crank-shaft of an engine whose stroke is so regulated as to give to said blades a travel of one hundred and nine (109°) degrees or thereabout. The reciprocating motion may be imparted to the trunk through any arrangement of machinery and by any description of engine. A feathering motion, or motion whereby the blades are alternately turned on their edge at one end and on their side at the other end of the stroke, is given to said blades, so that when they are moving in the same direction as the ship the edge of said blade offers as little resistance as possible to the water, as hereinafter more fully explained. Reversing-gear is also provided, by means of which the blade-feathering mechanism may be so set as to immediately alter the blades from propelling the vessel ahead to propelling her astern, or one of the blades may be caused to work ahead and the other astern, so as to turn said vessel. These movements can be accomplished while said trunk and attached mechanism and blades are in full work, and without stopping or reversing the engine.

Referring to my drawings, Figure 1 shows a longitudinal view of a vessel having a pair of my propellers fitted thereto at their proposed positions, and Fig. 2 a cross-section on the line *a a*, looking forward; Fig. 3, a cross-section on the line *b b*, also looking forward, showing the blades in their normal working positions. Fig. 4 is an athwart-ship, and Fig. 5 a fore-and-aft, elevation of my improved propeller and of the machinery for driving it. Fig. 6 is an athwart-ship sectional elevation of same. Fig. 7 is a plan of lower part of same, showing connection from crank-shaft of steam-engine to trunk, and Fig. 8 is a plan on top of suspension-plate. Fig. 9 is a vertical fore-and-aft section of the trunk. Figs. 10 and 11 are top and bottom plans of same. Fig. 12 is a horizontal section at *c c* in Fig. 1, and Fig. 13 a plan of bottom of said trunk with lower cap removed. Figs. 14 and 15 are similar views to Figs. 12 and 10 of an alternative method of arranging the feathering-cranks. Figs. 16 and 17 show vertical section and plan of an alternative construction of the bearings for the propeller shafts. Fig. 18 is a back view of the roller-carriage. Fig. 19 is a plan of top, and Fig. 20 a plan of bottom, roller-paths. Fig. 21, a horizontal section at *d d*, Fig. 4. Figs. 22 and 23 are plans of the upper and lower striking-gear for operating the paths, and Figs. 24 and 25 show an alternative construction of the striking-arms by facing them with vulcanite or some such material, (marked R.) Fig. 26 shows an alternative form of blade for the propellers. Figs. 27 and 28 show alternative constructions of the feathering-rods, and Fig. 29 shows half-elevation and half-section, and Fig. 30 half top plan and half horizontal section of an alternative arrangement for transmitting the feathering motion to the before-mentioned propeller-blades.

I will refer now to all the figures excepting those showing alternative methods.

Similar letters will indicate the same parts throughout the drawings.

A and A' are the two blades, each on its own stem or shaft A², and forming together one propeller. On these shafts are formed the solid collar A³, disks A⁴, and crank-pins A⁵, as shown.

B is the trunk, and B' the vertical shaft to which it is attached by flanges $B^2$, bolted together by the tap-bolts $B^3$. The lower end of the trunk B is enlarged in diameter, and has a cap, $B^4$, fitted thereon. This cap is let into a suitable recess in the trunk, and bolted thereto by means of the tap-bolts $B^5$. This cap and the lower end of the trunk form the bearings for the shafts $A^2$ and disks $A^4$, and a packing-gland, $B^6$, is also fitted into them, as shown. In said trunk B a hole is provided at $b$, so as to form an outlet for any sea-water which may get there.

C is the bed-plate to which the standards C' are bolted, said standards supporting the circular frame D of the roller-paths. Into the top flange of said frame D are fixed the four columns E, which support and are bolted to the suspension-plate E', which has a central boss, $E^2$, on its upper face to form a bearing for the vertical shaft B', and also to form a path on which the suspension-rollers $E^3$ travel. These rollers revolve on the transverse shaft $E^4$, which is fitted into the uppermost end of said vertical shaft B'.

$E^5$ is a loose collar fitted on the shaft B' and working against the under side of suspension-plate E', as shown. A large boss, $C^2$, is formed on and projects downward from the bed-plate C. Into this boss is fitted a brush, $C^3$, which is lined inside with strips of lignum-vitæ $C^4$, as shown in Fig. 21. Above this is a stuffing-box, $C^5$, fitted with gland $C^6$. These parts $C^3$, $C^5$, and $C^6$ are made in halves, $C^5$ being bolted to the bed-plate by the bolts $C^7$, while the gland into stuffing-box is fastened by the bolts $C^8$.

$B^7$ are the connecting-rods, $B^8$ the cranks working in the bearings $B^9$, which are fitted into the upper square portion of trunk B.

F are the roller-carriage brackets carrying the path-rollers F', friction-rollers $F^2$, and guide-rods $F^3$, which work in the guide-brackets $F^4$, fitted on the outside of trunk B. This carriage has an oblong hole or slot, $F^5$, formed in its back face, in which the outer pins or cranks $B^8$ work. D' are the upper and $D^2$ the lower movable roller-paths, the upper ones having a dovetailed slide-piece, $D^3$, formed on them, which slides in a suitable recess formed in the path or flange of frame D, and the lower ones having the two dovetailed slide-pieces $D^4$, which work in suitable recesses in lower roller-face of the frame D. It will be noticed that the working-surface of the lower roller-paths $D^2$ are beveled to suit the lower rollers F', as shown. These movable paths D' and $D^2$ have snugs $D^5$ formed on their outer periphery, between which the pins $D^6$ are fitted.

G G are brackets fixed to the frame D by means of the bolts G', and have a pin, $G^2$, fitted into them, which supports the lever $G^3$.

$G^4$ is a rod connecting said lever $G^3$ with bell-crank $G^5$. This bell-crank has a slotted hole, $G^6$, for regulating the stroke, and is supported in the bracket $G^7$, which is bolted to the top of the circular frame D.

$G^8$ is a rod connecting the arm $G^9$ on the square portion of the tappet-shaft H to said bell-crank $G^5$.

$G^{10}$ is a forked bracket bolted to the suspension-plate for supporting the arm $G^9$.

H' is a cranked lever supported in the bracket $H^2$, bolted to the top of suspension-plate E'. This lever has a bow or forked end, which carries two pins, $H^3$, fitted therein, said pins being placed in the groove formed in the circular disk $H^4$, which is keyed to the top end of the tappet-shaft H. This tappet-shaft is supported at top in a bearing in the suspension-plate, and at bottom in a bearing in the arm $H^5$, projecting from before-mentioned bracket $G^7$.

$H^6$, $H^7$, and $H^8$ are the tappet-arms projecting from said tappet-shaft H.

I is the upper collar, of the form shown in Fig. 22, having the three striking-pins I' bolted into the three oblong holes provided therein. It is keyed onto the vertical shaft B', as shown.

J is the lower collar, of the form shown in Fig. 23, and having the three striking-pins J' bolted in the oblong holes therein, which said holes are for the purpose of adjustment, and which said collar is also keyed onto the vertical shaft B'. The pins I' and J' in the brackets I and J may have set-screws, as shown at $J^2$, fitted into the lugs, so as to prevent said pins from moving sidewise.

K is the cylinder of the engine; K', its piston-rod; $K^2$, cross-head; $K^3$, connecting-rod; $K^4$, crank-shaft supported in bearings $K^5$ at top, and footstep $K^6$ at bottom, which has a wearing-piece of lignum-vitæ, $K^7$, fitted therein.

$K^8$ is the fly-wheel. This engine gives the necessary motion to the connecting-rod L, which is connected at the one end to the crank-shaft $K^4$, and at the other to the pin L', between the arms $L^2$, formed on the vertical trunk B, thereby giving the required reciprocating motion through said trunk to the propeller. The alternative arrangement of one of the double-ended cranks $B^8$, so as to cause the after edges of the blades to always lift up in the feathering motion when going aft, and which I think is preferable, is accomplished by simply making one of the cranks with the pins on different sides of its center, which crank is marked $B^{10}$ in Fig. 14 of the drawings. Fig. 15 shows top view of trunk B, with the guide-brackets $F^4$ altered to suit this construction.

Figs. 16 and 17 show the alternative construction of the bearings for the propeller-shaft, in which the half-brasses M are set into the bottom of the trunk and cap, and held therein by the set-screws M'. Metallic and india-rubber packing-rings $M^2$ and $M^3$ are inserted in the stuffing-box, as shown.

Fig. 27 shows the alternative construction of the feathering-rods, so as to be able to adjust the top and bottom brasses, N, by the nuts N' on the ends of the strap $N^2$, which strap passes around the rod $N^3$, and the lower brasses or the end of the strap may be formed into a bow having a central set-bolt, N⁴, as shown in Fig. 28 of the drawings.

Figure 6:
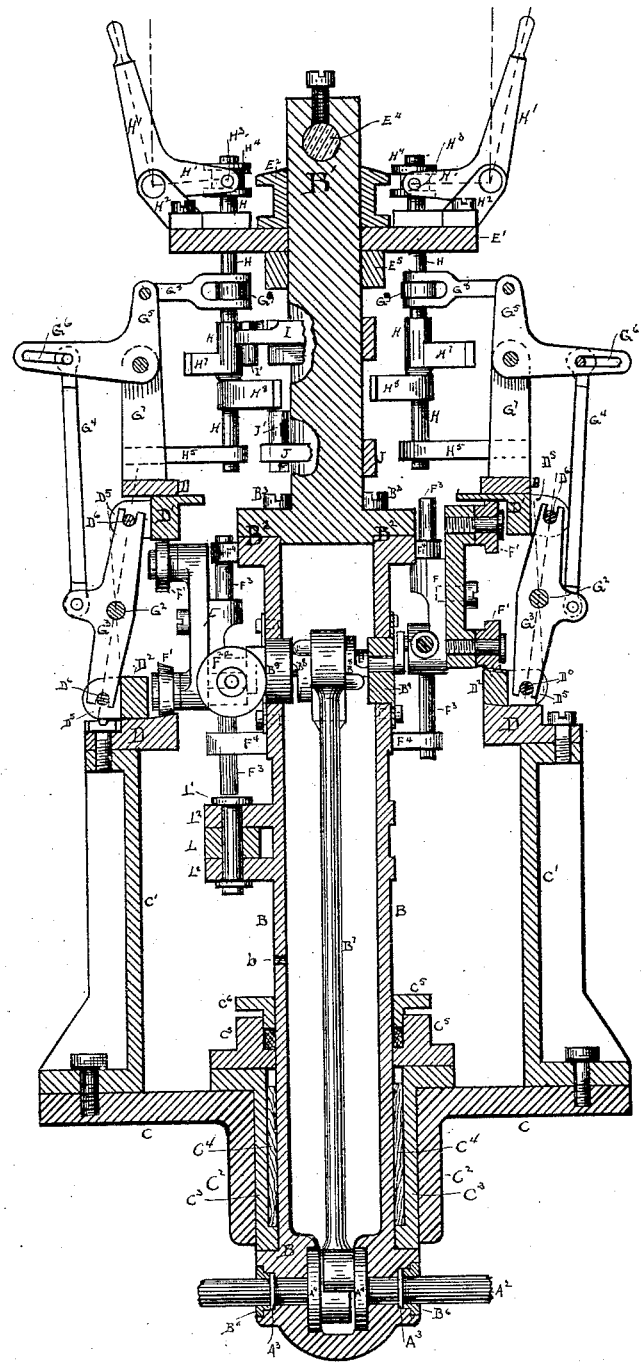

Figs. 29 and 30 show an alternative arrangement for conveying the motion from the roller-paths to the feathering-rods in the trunk B. By this arrangement the cranks B⁸ in Fig. 12 and the carriage F in Fig. 18 are dispensed with, and the path-rollers F' work on bearings projecting from the guide-block O, which has friction-rollers O' fitted to it, working against the inner side of the guide-box O² on the one side and against the flat face of the trunk B on the other side. Projecting inward from said guide-block O, and through the slot in said trunk, is a pin, O³, to which the connecting-rod B⁷ is attached. From thence to the blades the mechanical arrangements are the same as already described, and shown more especially in Figs. 6 and 9.

In each steamship there may be two or more of my propellers and two or more sets of the requisite driving machinery. In Figs. 1, 2, and 3 I have shown two of such sets, which is what I prefer.

Figure 4:
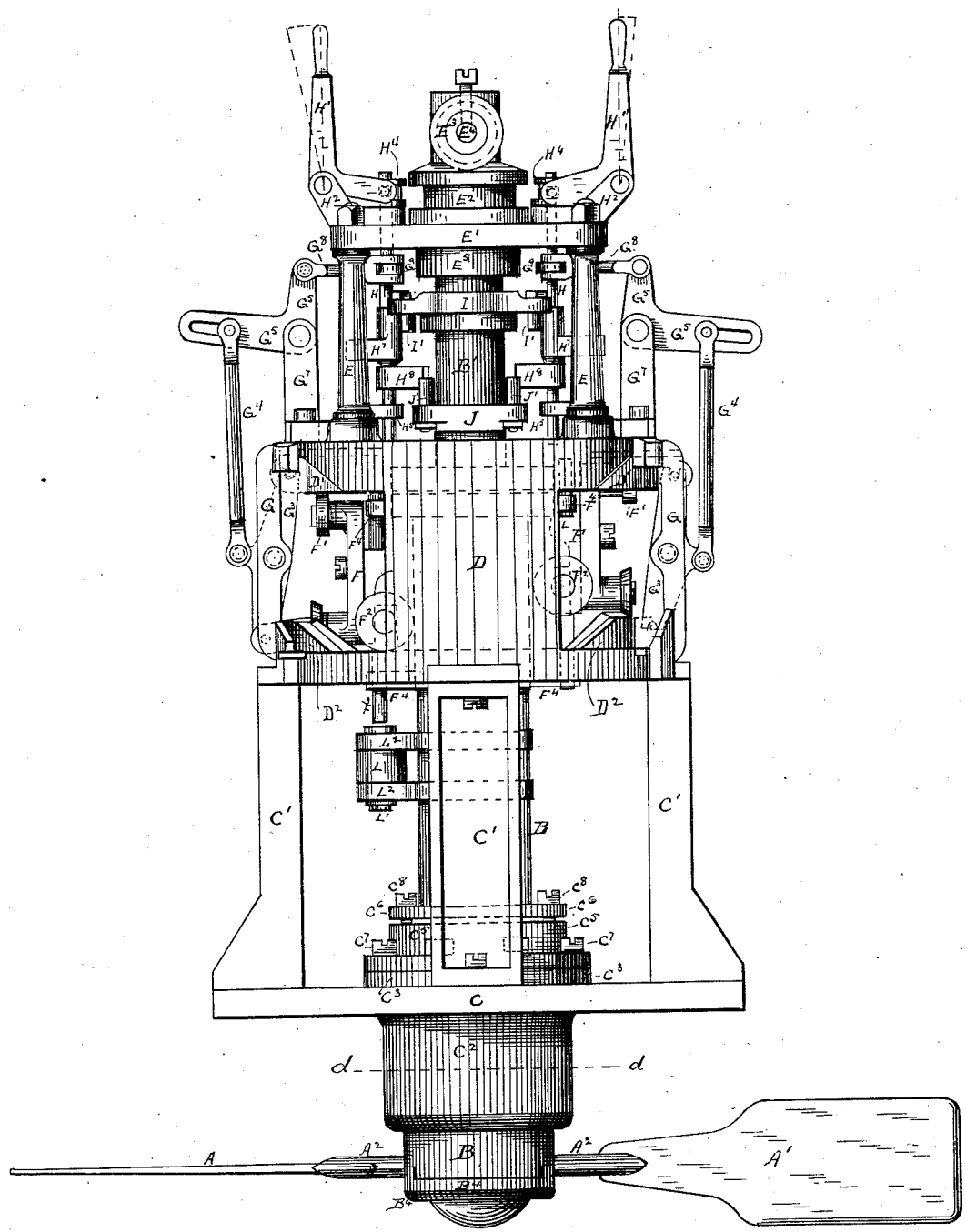
Figure 5:
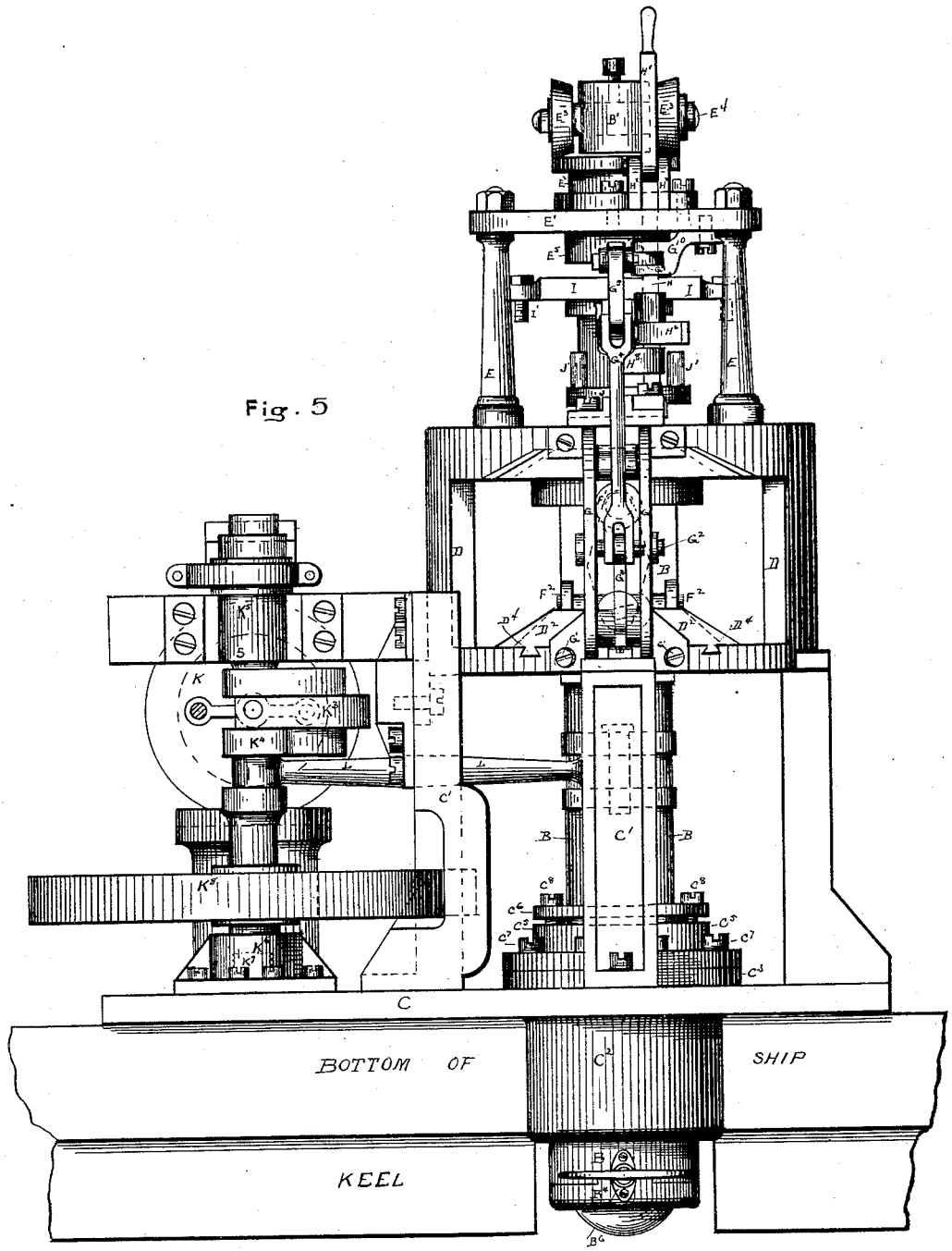

The operation of my propellers and the machinery for driving and governing same in a ship fitted, as I prefer, with a pair of such propellers and their driving-gear, as illustrated in Figs. 1, 2, and 3, is as follows: Motion being imparted to the trunks, and from them to the propellers, by the contrivances shown and already described, causes the starboard blade on the forward and the port blade on the after propeller to be vertical when traveling aft, and consequently the ship to be thereby propelled forward, and the port blade on the forward propeller and the starboard blade on the aft propeller to be in the reverse position—that is, edgewise against the water while traveling forward; or, in other words, one of the blades of each propeller should be vertical for that portion of the astern stroke during which it is designed to be so, and edgewise for its full forward stroke, as shown at A' and A in Fig. 4. At each end of the stroke, and in this case as the lower tappets, H⁸, are in position, and supposing the machine to have just returned from the forward end on the port side, then the lower striking-frame, J, which is keyed onto the upright shaft-extension B' of the trunk B, would have come into contact with the arm-tappet H⁸ on the tappet-shaft H, and through the medium of the arms G⁹, connecting-rod G⁸, bell-crank G⁵, connecting-rod G⁴, and lever G³, which operates the top and bottom movable paths, D' and D², will place them in the position shown in Fig. 4. The dotted circles in Fig. 22 indicate the position the pins assume at the end of each stroke or vibration of the trunk B. When the end of this stroke is reached, and while the path-rollers F' are clear of the movable paths D' and D², the striking-pins J' will come in contact with the opposite side of the tappet-arms H⁸, thereby shifting the movable paths to the reverse positions. The top one, D', on the port side will be out, and the lower one, D², in, and on the starboard side the top one, D', will be in and the lower one, D², out, so that the carriages F and rollers F', traveling between the paths, as described, will cause the blade A to be vertical in coming astern, and the blade A' edgewise in going ahead. The feathering-gear from path-rollers F'' to blades A and A' is as follows: The rollers F' being attached to the carriages F, and such carriages having slots F⁵ at their back faces, into which the outer pins of the double crank B⁸ work, and the connecting-rods B⁷, inside the trunk B, being connected at their top end to the inner pins of the cranks B⁸, and at their lower ends to the pins A⁵ on the disks A⁴, the carriages F are caused to rise and fall by traveling on the paths, and so cause the blades A and A' to twist or feather from the vertical to the horizontal position. When it is required to reverse the course of the ship from ahead to astern, which in practice means that the carriage F should travel on top of the movable roller-paths D² when working forward, and consequently the blades be vertical when going forward, I require to place the cranked hand-levers H' in the position shown in Fig. 6, and so raise the lower arm-tappets, H⁸, clear of the lower striking-frame, J, and the same movement brings the upper arm-tappets, H⁶ and H⁷, into the line of contact with the upper striking-frame, I, which, when said frame and tappets come in contact, reverses the movable paths, as required.

Having thus described the nature of my invention and the manner of performing same, I would have it understood that I do not confine myself to the particular shapes or forms of the propeller-blades shown in the drawings, as any convenient form of blade having the required surface to propel the ship may be used; and, further, I do not confine myself to any particular form of steam-engine for driving my propeller, as any description will do if of sufficient power and placed in any convenient position adjacent to the trunk of said propellers; but

What I believe to be new, and therefore claim as my improvements in steamship-propellers and in the machinery for driving same, is—

1. A steamship-propeller consisting of two duplicate sets of oar-shaped blades having reciprocations in a horizontal plane and a feathering motion, combined with vertical partly-rotating trunks provided with separate bearings for the said blades, and within said trunks separate cranks and feathering-rods whereby said propellers may be located beneath the bottom of the ship forward of the run, and the several sets arranged to give simultaneous propelling-strokes on each side of the keel, as set forth.

2. The combination, with a partly-rotating trunk, of two reciprocating feathering-blades mounted on separate shafts with separate cranks, and the rods which give the feathering motion to the propeller-blades separately located within said trunk, whereby said oars are separately operated and controlled, substantially as set forth.

3. The reciprocating trunk B, the oar-shafts $A^2 A^2$, journaled in the lower end of said trunk, with cranks $A^5 A^5$ at their inner ends, combined with the rods $B^7 B^7$, respectively connected at their upper ends with cranks $B^8 B^8$, and the cam-tracks $D^2 D^2$, whereby said oars are caused to feather during each alternate stroke.

4. The reciprocating trunk B, the oar-shafts $A^2 A^2$, journaled in the lower end of said trunk, with cranks $A^5 A^5$ at their inner ends, and the rods $B^7 B^7$, respectively connected at their upper ends with cranks $B^8 B^8$, combined with movable cam-tracks $D' D' D^2 D^2$, provided with a rock-shaft controlled by the reciprocation of said trunk to move said cam-tracks alternately into and out of the path of the friction-rollers which control said cranks $B^8$, substantially as shown and described.

5. The reciprocating trunk B, the oar-shafts $A^2 A^2$, journaled in the lower end of said trunk, with cranks $A^5 A^5$ at their inner ends, the rods $B^7 B^7$, respectively connected at their upper ends with cranks $B^8 B^8$, movable cam-tracks $D' D' D^2 D^2$, provided with a rock-shaft, $G^2$, and rocking arms $G^3$, connected at the ends respectively with the movable cam-tracks $D'$ and $D^2$, combined with the connecting-rod $G^2$, connected at its upper end with a rock-shaft, H, which is provided with tappets $H^8$, and the lugs $J'$, attached to and reciprocated by said trunk B, for the purpose of moving said trackways alternately and coincidently with the reciprocation of said trunk to feather the oars, as set forth.

6. The reciprocating trunk B, the oar-shafts $A^2 A^2$, journaled in the lower end of said trunk, with cranks $A^5 A^5$ at their inner ends, the rods $B^7 B^7$, respectively connected at their upper ends with cranks $B^8 B^8$, movable cam-tracks $D' D' D^2 D^2$, provided with a rock-shaft, $G^2$, and rocking arms $G^3$, connected at the ends respectively with the movable cam-tracks $D'$ and $D^2$, an endwise movable rock-shaft, H, provided with tappet, $H^6 H^7 H^8$, combined with lugs $J'$ $I'$, carried by the reciprocating trunk B, and a lever, $H'$, whereby said shaft H may be moved endwise to disengage tappets $H^8$ from the lugs $J'$ and engage tappets $H^6$ and $H^7$ with lugs $I'$, and thereby reverse the relative movements of the cam-trackways $D' D^2$ and the oar-blades, as set forth.

7. The reciprocating trunk B, the oar-shafts $A^2 A^2$, journaled in the lower end of said trunk, with cranks $A^5 A^5$ at their inner ends, and the rods $B^7 B^7$, respectively connected at their upper ends with cranks $B^8 B^8$, whereby the oar-blades are vibrated and feathered, as described, combined with the circular track $E^2$, attached to the frame $E'$, and the wheels $E^3$, attached to the said trunk, whereby said trunk is suspended, as set forth.

ROBERT WILCOX.

Witnesses:
  EDWARD WATERS,
  WALTER SMYTHE BAYSTON.